(12) United States Patent
Shimoda et al.

(10) Patent No.: US 10,351,943 B2
(45) Date of Patent: Jul. 16, 2019

(54) MG-CONTAINING ZN ALLOY COATED STEEL

(71) Applicant: NIPPON STEEL & SUMITOMO METAL CORPORATION, Tokyo (JP)

(72) Inventors: Nobuyuki Shimoda, Tokyo (JP); Kohei Tokuda, Tokyo (JP); Kenichiro Matsumura, Tokyo (JP); Yasuto Goto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/759,992

(22) PCT Filed: Sep. 29, 2016

(86) PCT No.: PCT/JP2016/078934
§ 371 (c)(1),
(2) Date: Mar. 14, 2018

(87) PCT Pub. No.: WO2017/057638
PCT Pub. Date: Apr. 6, 2017

(65) Prior Publication Data
US 2018/0265955 A1    Sep. 20, 2018

(30) Foreign Application Priority Data

Sep. 29, 2015 (JP) ................. 2015-191855

(51) Int. Cl.
*C23C 4/08* (2016.01)
*C22C 18/00* (2006.01)
(Continued)

(52) U.S. Cl.
CPC .............. *C23C 4/08* (2013.01); *B22F 1/0055* (2013.01); *B22F 1/02* (2013.01); *B22F 3/115* (2013.01);
(Continued)

(58) Field of Classification Search
CPC .......... B22F 1/0011; B22F 1/00; B22F 3/115; B22F 1/0055; B22F 1/02; B22F 7/04;
(Continued)

(56) References Cited

U.S. PATENT DOCUMENTS

| 2010/0018612 | A1  | 1/2010 | Tokuda et al. |
| 2013/0236739 | A1* | 9/2013 | Yoshida ............... C23C 2/02 428/653 |
| 2017/0100915 | A1  | 4/2017 | Tokuda |

FOREIGN PATENT DOCUMENTS

| JP | 3305573 B2    | 7/2002 |
| JP | 2008-255464 A | 10/2008 |

(Continued)

OTHER PUBLICATIONS

International Search Report for PCT/JP2016/078934 dated Dec. 6, 2016.
(Continued)

*Primary Examiner* — Michael E. La Villa
(74) *Attorney, Agent, or Firm* — Birch, Stewart, Kolasch & Birch, LLP (57) ABSTRACT

A Mg-containing Zn alloy coated steel including a steel and a metallic coating layer placed on a surface of the steel, in which the metallic coating layer is a layered structure of plural flat-form metal particles having a particle diameter of from 5 to 100 μm, and a thickness of from 0.5 to 30 μm, the composition of the metal particles include Zn from 11 to 80 mass %, Al from 3 to 80 mass %, Mg from 8 to 45 mass %, and Ca from 1 to 5 mass %, and the Zn, Al, and Mg content satisfy Zn+Al>Mg, and in which the metal particles include a quasicrystalline phase, an $MgZn_2$ phase, and optionally a balance structure.

5 Claims, 1 Drawing Sheet (51) Int. Cl.

| | | |
|---|---|---|
| B22F 3/115 | (2006.01) | |
| B32B 15/01 | (2006.01) | |
| C22C 21/00 | (2006.01) | |
| B32B 15/18 | (2006.01) | |
| B32B 15/04 | (2006.01) | |
| C22C 21/06 | (2006.01) | |
| C22C 21/08 | (2006.01) | |
| B32B 15/20 | (2006.01) | |
| C23C 28/00 | (2006.01) | |
| C23C 4/131 | (2016.01) | |
| C23C 28/02 | (2006.01) | |
| C23C 4/123 | (2016.01) | |
| C23C 4/129 | (2016.01) | |
| C23C 4/12 | (2016.01) | |
| C23C 30/00 | (2006.01) | |
| B22F 1/00 | (2006.01) | |
| B22F 1/02 | (2006.01) | |
| B22F 7/04 | (2006.01) | |
| C23C 4/06 | (2016.01) | |
| C23C 4/18 | (2006.01) | |
| C22C 1/04 | (2006.01) | |
| C22C 18/04 | (2006.01) | |
| C23C 4/134 | (2016.01) | |

(52) U.S. Cl.
CPC ............... *B22F 7/04* (2013.01); *B32B 15/012* (2013.01); *B32B 15/04* (2013.01); *B32B 15/043* (2013.01); *B32B 15/18* (2013.01); *B32B 15/20* (2013.01); *C22C 1/0483* (2013.01); *C22C 18/00* (2013.01); *C22C 18/04* (2013.01); *C22C 21/00* (2013.01); *C22C 21/06* (2013.01); *C22C 21/08* (2013.01); *C23C 4/06* (2013.01); *C23C 4/12* (2013.01); *C23C 4/123* (2016.01); *C23C 4/129* (2016.01); *C23C 4/131* (2016.01); *C23C 4/134* (2016.01); *C23C 4/18* (2013.01); *C23C 28/02* (2013.01); *C23C 28/021* (2013.01); *C23C 28/023* (2013.01); *C23C 28/025* (2013.01); *C23C 28/30* (2013.01); *C23C 28/32* (2013.01); *C23C 28/321* (2013.01); *C23C 28/322* (2013.01); *C23C 28/3225* (2013.01); *C23C 28/345* (2013.01); *C23C 28/3455* (2013.01); *C23C 30/00* (2013.01); *C23C 30/005* (2013.01); *B22F 1/0011* (2013.01); *B22F 2999/00* (2013.01); *B32B 15/013* (2013.01); *Y10T 428/1266* (2015.01); *Y10T 428/1275* (2015.01); *Y10T 428/12611* (2015.01); *Y10T 428/12618* (2015.01); *Y10T 428/12667* (2015.01); *Y10T 428/12729* (2015.01); *Y10T 428/12757* (2015.01); *Y10T 428/12764* (2015.01); *Y10T 428/12799* (2015.01); *Y10T 428/12972* (2015.01); *Y10T 428/12979* (2015.01); *Y10T 428/24967* (2015.01); *Y10T 428/24975* (2015.01); *Y10T 428/263* (2015.01); *Y10T 428/264* (2015.01); *Y10T 428/265* (2015.01)

(58) Field of Classification Search
CPC ........... B22F 2999/00; B22F 2007/042; B32B 15/013; B32B 15/012; B32B 15/04; B32B 15/043; B32B 15/18; B32B 15/20; C22C 21/00; C22C 21/06; C22C 21/08; C22C 18/00; C22C 18/04; C22C 1/0483; C23C 4/08; C23C 4/06; C23C 4/12; C23C 4/123; C23C 4/129; C23C 4/131; C23C 4/134; C23C 28/02; C23C 28/021; C23C 28/023; C23C 28/025; C23C 28/30; C23C 28/32; C23C 28/321; C23C 28/322; C23C 28/3225; C23C 28/345; C23C 28/3455; C23C 30/00; C23C 30/005; C23C 4/18; Y10T 428/1266; Y10T 428/12667; Y10T 428/12611; Y10T 428/12618; Y10T 428/12757; Y10T 428/1275 428/12764; Y10T 428/12799; Y10T 428/12729; Y10T 428/12972; Y10T 428/12979; Y10T 428/24967; Y10T 428/24975; Y10T 428/263; Y10T 428/264; Y10T 428/265

See application file for complete search history.

(56) References Cited

FOREIGN PATENT DOCUMENTS

| | | |
|---|---|---|
| JP | 4757692 B2 | 8/2011 |
| JP | 2011-190507 A | 9/2011 |
| JP | 2012-107324 A | 6/2012 |
| JP | 2014-208880 A | 11/2014 |
| JP | 2015/145721 A1 | 10/2015 |

OTHER PUBLICATIONS

Written Opinion of the International Searching Authority for PCT/JP2016/078934 (PCT/ISA/237) dated Dec. 6, 2016.

* cited by examiner

MG-CONTAINING ZN ALLOY COATED STEEL

TECHNICAL FIELD

The present disclosure relates to an Mg-containing Zn alloy coated steel.

BACKGROUND ART

Mg-containing Zn alloy coatings with highly corrosion-resistant performances demanded mainly in building material applications are extremely hard and brittle. Therefore, coating structures are prone to break during shape processing at metallic coating layers, or interfaces between a metallic coating layer and a steel leading to destructions such as exfoliation, and as the result phenomena called as powdering, in which severe deficiencies of metallic coating layers occur, may be observed. In a case in which powdering occurs, resultant severe decreases in the corrosion resistance itself of coated steels are foreseen.

Improvement of the corrosion resistance of steels by coating the steel surface with a metal such as Zn has been heretofore widely known, and steels coated with Zn, Zn—Al, Zn—Al—Mg, Al—Si, or the like are produced presently on a massive scale. With respect to coated steels, besides corrosion resistance various functions, such as abrasion resistance, are demanded frequently. As a method of coating a steel, a hot dip metal coating method is most widely used.

This is because hot dip metal coating is suitable for mass production, and by performing a processing, such as bending, drawing, and welding, many products may be produced.

The corrosion resistance demanded for a coated steel has been yearly getting higher, and a coating with an Mg content higher than before has been recently proposed as by Patent Literature 1 or Patent Literature 2 below. Such a coating is characterized in that 1) it contains more Mg than a conventional coating, 2) it can exhibit higher corrosion resistance at a planar section than before by regulating the structure, 3) it exhibits corrosion resistance at an end surface, etc., and 4) it has high corrosion resistance even in an atmosphere such as an alkaline atmosphere where a conventional zinc-based or aluminum-based coating has weakness.

In contrast to continuous hot dip metal coating onto steel sheets, techniques of immersion coating (dipping), thermal spraying, vapor deposition, etc. are methods able to coat hard-to-process alloys, because they can be applied to coating of products after processing. Among them, since a thermal spray method is a coating method, by which steels are not dipped in molten metals, has such advantages that there is little thermal influence on steels, or little restriction on the dimension of steels, and the allowable range of the melting point of metals or alloys usable for coating is broad.

A basic method of enhancing the corrosion resistance of coatings is to add Zn to coatings, however in the case of coatings containing solely Zn, the corrosion resistance may be not adequate in many applications. Therefore, an Mg-containing thermal spray coating as described in Patent Literature 3 has been proposed.

The technology is to thermally spray a Zn alloy containing Mg at from 0.3% to 15% to a surface of a steel, and forms a thermally sprayed film superior in corrosion resistance and resistance to scratch. Further, a thermal spray method as a technology for improving corrosion resistance, although limited to a weld, has been proposed as by Patent Literature 4 and Patent Literature 5. The technology according to Patent Literature 4 or Patent Literature 5 is concerning a multilayer-type thermal spray coating containing Zn, Al, Mg, Si, or the like.

Further, in Patent Literature 6 discloses "a thermal spray material superior in explosion proof during thermal spraying and corrosion resistance of a thermally sprayed area, characterized in that in terms of % by mass the Al content is from 13 to 78%, the Ca content is from 1 to 5%, the total content of Al and Ca is 79% or less, and the balance is Mg and unavoidable impurities".

Patent Literature 1: Japanese Patent Application Laid-Open (JP-A) No. 2008-255464
Patent Literature 2: JP-A No. 2011-190507
Patent Literature 3: Japanese Patent No. 3305573
Patent Literature 4: JP-A No. 2014-208880
Patent Literature 5: JP-A No. 2012-107324
Patent Literature 6: Japanese Patent No. 4757692

SUMMARY OF INVENTION

Technical Problem

However, the processability of a hot dip metal coating film may be impaired depending on the coating composition, such that a thicker film may be hardly obtainable, and a processing method may incur restriction. Especially in the case of a non-equilibrium phase, or a film containing an intermetallic compound, such tendency is significant, and the same is also true with respect to the proposals of Patent Literature 1 and Patent Literature 2. If a film is exfoliated at a processed area, there is a risk for remarkable decrease in the corrosion resistance of a steel.

Although a thermal spray coating according to Patent Literature 3 is superior in corrosion resistance, and resistance to scratch, especially the corrosion resistance in an alkaline region is not adequate. A thermal spray coating according to Patent Literature 4 or Patent Literature 5 is only to make up a conventional coating lost by welding and the corrosion resistance, or abrasion resistance is far from adequate. Currently, there is still room for improvement also concerning Patent Literature 6.

An object of an embodiment of the present disclosure is to eliminate the above drawbacks, and to provide a steel with a metallic coating layer having higher corrosion resistance and higher abrasion resistance compared to conventional art, and being superior in resistance to scratch.

Solution to Problem

This disclosure has been developed under such circumstances, and includes the following embodiments.

[1]

An Mg-containing Zn alloy coated steel, including;
a steel; and
a metallic coating layer placed on a surface of the steel, in which:
the metallic coating layer is a layered structure of a flat-form metal particle having a particle diameter of from 5 to 100 μm, and a thickness of from 0.5 to 30 μm,
a composition of the metallic coating layer satisfies, in terms of % by mass, Zn being from 11 to 80%, Al being from 3 to 80%, Mg being from 8 to 45%, Ca being from 1 to 5%, and Zn+Al>Mg, and
the metallic coating layer includes a quasicrystalline phase, an $MgZn_2$ phase, and a balance structure, in which a total area fraction of the quasicrystalline phase and the $MgZn_2$ phase is 45% or more, an area fraction of the balance structure is from 0 to 55%, an area fraction of the quasicrystalline phase is 20% or more, and an area fraction of the $MgZn_2$ phase is 3% or more.

[2] The Mg-containing Zn alloy coated steel according to [1], in which a Al content is from 3% to less than 13%, in terms of % by mass.

[3] The Mg-containing Zn alloy coated steel according to [1] or [2], further including an oxide film having a film thickness of from 1 nm to 1000 nm, the oxide film covering a surface of the metal particle.

[4] The Mg-containing Zn alloy coated steel according to any one of [1] to [3], in which the metallic coating layer is a thermal spray coating layer.

[5] The Mg-containing Zn alloy coated steel according to any one of [1] to [4], in which the composition of the metallic coating layer includes one or more of , in terms of % by mass, Y at from 0% to 3.5%, La at from 0% to 3.5%, Ce at from 0% to 3.5%, Si at from 0% to 3.5%, Ti at from 0% to 0.5%, Cr at from 0% to 0.5%, Co at from 0% to 0.5%, Ni at from 0% to 0.5%, V at from 0% to 0.5%, Nb at from 0% to 0.5%, Cu at from 0% to 0.5%, Sn at from 0% to 0.5%, Mn at from 0% to 0.2%, Sr at from 0% to 0.5%, Sb at from 0% to 0.5%, Pb at from 0% to 0.5%, C at from 0% to 0.5%, Fe at from 0% to 0.5%, and Cd at from 0% to 0.5%, and satisfies the following Formula (A), and the following Formula (B):

Formula (A): Ca+Y+La+Ce≤3.5%

Formula (B): Ti+Cr+Co+Ni+V+Nb+Cu+Sn+Mn+Sr+Sb+Pb+C+Fe+Cd≤0.5%, in which, in Formula (A) and Formula (B), an element symbol stands for the content of the element in terms of % by mass.

Advantageous Effects of Invention

According to an embodiment of the disclosure, an Mg-containing Zn alloy coated steel extremely superior in corrosion resistance and abrasion resistance, and superior in resistance to scratch may be provided. By this reason, a steel applicable broadly to an automobile use, a building use, a residential use, etc. may be provided so as to contribute greatly to industrial development by improvement of component lifetime, effective utilization of resources, reduction of environmental load, reduction of labor and cost for maintenance, etc.

Further, by application of the technology according to an embodiment of this disclosure to a processed component, a steel pipe, etc., a high hardness Mg-containing Zn alloy coated steel having corrosion resistance superior to a conventional Mg-containing coating, and also being superior in corrosion resistance in an alkaline region may be provided.

DESCRIPTION OF EMBODIMENTS

The inventors have found that a metallic coating layer with a Zn—Mg—Al—Ca system including a quasicrystalline phase exhibits as a corrosion resistant coating layer high corrosion resistance and abrasion resistance as well as resistance to scratch, and studied the processability of a metallic coating layer based on the system, thereby arriving at the present disclosure. Namely, it has been found that a structure including a quasicrystalline phase is an extremely effective structure for improving corrosion resistance, abrasion resistance, and resistance to scratch, and that the structure including a quasicrystalline phase may be formed by a thermal spray method.

An Mg-containing Zn alloy coated steel superior in corrosion resistance, abrasion resistance, and resistance to scratch according to an embodiment of the disclosure will be described below.

In this regard, a numerical range expressed by "from x to y" includes the values of x and y in the range as the minimum and maximum values, respectively.

The expression of "%" with respect to the content of a component (an element) means herein "% by mass".

Figure 1:
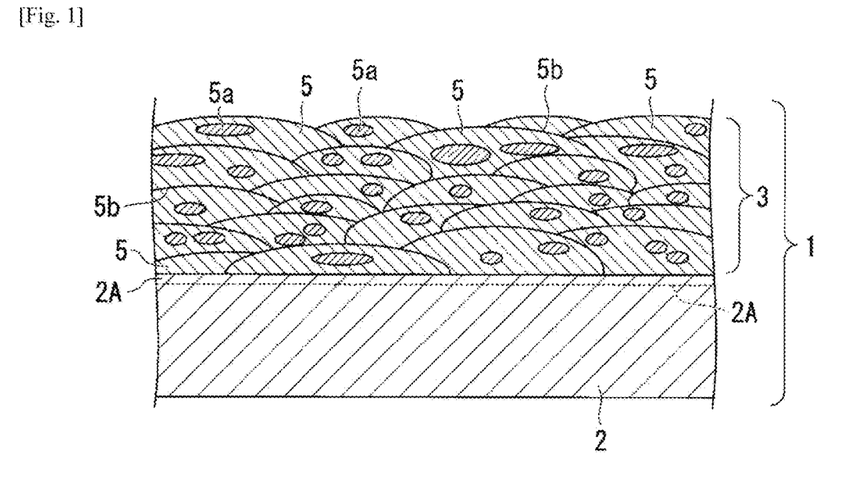
FIG. 1 is a sectional view showing a coated steel according to an embodiment of the disclosure.

An Mg-containing Zn alloy coated steel 1 according to the embodiment of the disclosure is composed essentially of a steel 2 for a steel sheet, a steel pipe, a civil engineering building material (a guard rail, a shielding wall, a corrugated pipe, etc.), a household electrical appliance component (a housing of an outdoor unit of an air conditioner, etc.), automotive parts (a chassis component, etc.), etc., and a metallic coating layer (thermal spray coating layer) 3 formed by thermal spraying on a surface of the steel 2 for example as shown in a cross-sectional structure in FIG. 1 (a cross-sectional structure cut in the thickness direction of a coating layer). A metallic coating layer 3 is constituted with a layered structure of plural a flat-form metal particle 5, which are thinner than the metallic coating layer 3 and have a particle diameter several times as large as their own thickness. In a metallic coating layer 3, for example, plural metal particles 5 are arranged side by side in the planar directions along a surface of a steel 2 covering the surface of a steel 2 without gaps, and at the same time plural particles are stacked without a gap in the thickness direction of the steel 2 on the surface of the steel 2. In other words, a metallic coating layer 3 is, for example, constituted with a structure in which plural flat-shaped metal particles 5 are stacked in a muriform fashion.

Further, for example, an Fe—Al alloy layer 2A is formed at an interface region between a surface of a steel 2 and metal particles 5 in the bottom layer (interface region between a steel 2 and a metallic coating layer 3). Since a metal particle 5 solidifies in an extremely short time period as soon as it sticks to a steel sheet surface, this Fe—Al alloy layer 2A is, different from a general hot dip metal coating, very thin, which is equivalent to or less than the thickness of an oxide film on a surface of a metal particle 5 described below.

On a surface of each metal particle 5, an oxide film is formed, and as shown in FIG. 1 a clear interface 5b is formed among the respective metal particles. An oxide film formed on a surface of each metal particle 5 is an oxide film, which was formed when molten metal droplets flied through the air during thermal spraying, deposited on a surface of a steel 2, and solidified. The film thickness of an oxide film covering a surface of a metal particle 5 is for example approx. from 1 nm to 1000 nm. In other words, the presence of an oxide film having a film thickness of from 1 nm to 1000 nm, the oxide film covering a surface of a metal particle means that a metallic coating layer 3 has been formed by thermal spray.

There is no particular restriction on the material of a steel 2. As a steel 2, for example, a common steel, a Ni pre-coated steel, an Al-killed steel, and a part of high-alloy steels may be applicable. Also, there is no particular restriction on the shape of a steel 2.

An Fe—Al alloy layer 2A is formed on a surface of a steel 2, and the structure of the same includes, for example, an Al$_3$Fe phase and a Zn phase, the average composition of which includes Fe from 30 to 50%, Al from 50 to 70%, Zn from 2 to 10%, and impurities as the balance. Since a metal particle 5 contains Al and Zn at high contents as described below, an Fe—Al alloy layer 2A should have been formed through a reaction between a metal particle droplet melted during thermal spraying and Fe in a surface of a steel 2. The Al and Zn contained in an Fe—Al alloy layer 2A have been introduced as the result of partial diffusion of Al and Zn contained in a Zn—Mg—Al alloy constituting a metal particle 5.

The dimension and the structure of a metal particle 5 as well as the structure, the composition, etc. of a metallic coating layer 3 will be described below.

A metal particle 5 is composed of a quasicrystalline phase 5a, an MgZn$_2$ phase, and the balance structure. In a metallic coating layer 3, in which metal particles 5 are layered, the total area fraction of a quasicrystalline structure and an MgZn$_2$ phase is 45% or more, the area fraction of the balance structure is from 0 to 55%, the area fraction of a quasicrystalline phase is 20% or more, and the area fraction of an MgZn$_2$ phase is 3% or more.

It is not necessary for a metal particle 5 to have the above area fractions, insofar as a metallic coating layer 3 as a layered structure satisfies the above ranges of area fractions. Therefore, with respect to individuals among plural metal particles 5, even when some of the metal particles 5 do not contain a quasicrystalline phase 5a, insofar as there is a quasicrystalline phase 5a in some other metal particles 5 and the quasicrystalline phases 5a occupy 20% or more of the entire metallic coating layer 3. Therefore, it is so depicted in FIG. 1 that there is not a quasicrystalline phase 5a in part of metal particles 5.

Namely, the structure of a metallic coating layer 3 is constituted with a quasicrystalline phase, an MgZn$_2$ phase, and the balance structure, wherein the total area fraction of a quasicrystalline phase and an MgZn$_2$ phase is 45% or more, the area fraction of the balance structure is from 0 to 55%, the area fraction of a quasicrystalline phase is 20% or more, and the area fraction of an MgZn$_2$ phase is 3% or more.

In this case the total area fraction of a quasicrystalline structure and an MgZn$_2$ phase is more preferably 50% or more. On the other hand, from the viewpoint of industrial productivity, the total area fraction of a quasicrystalline structure and an MgZn$_2$ phase is preferably 80% or less.

The area fraction of the balance structure is more preferably from 0 to 20% from the viewpoint of corrosion resistance.

The area fraction of a quasicrystalline phase is more preferably 25% or more from the viewpoint of corrosion resistance. On the other hand, from the viewpoint of industrial productivity, the area fraction of a quasicrystalline phase is preferably 45% or less.

The area fraction of an MgZn$_2$ phase is more preferably 20% or more from the viewpoint of corrosion resistance. On the other hand, from the viewpoint of industrial productivity, the area fraction of an MgZn$_2$ phase is preferably 40% or less.

The particle diameter and thickness of metal particles 5 constituting a metallic coating layer 3 are nearly determined by the dimension of a metal particle before thermal spraying and a thermal spray condition. A metal particle 5 in a semi-molten state, where the outermost layer is melted, collides at a high speed against a surface of a steel 2 to be deformed, and solidifies in an extremely short time period. Since the dimension of a metal particle 5 in the parallel direction (direction parallel to a surface of a steel 2) becomes larger than the particle diameter of a metal particle 5 before thermal spraying, and the thickness of a metal particle 5 becomes less than the particle diameter of a metal particle 5 before thermal spraying, the shape of a metal particle 5 becomes a so to say flattened shape. Because of the above formation process, the planar shape of a metal particle 5 seldom becomes a perfect circle, and therefore the length of the longest diameter line is defined as the particle diameter of a metal particle 5. The thickness of a metal particle 5 is defined as the length of the longest line perpendicular to the longest diameter line of a particle.

It is preferable for a metal particle 5 that the particle diameter is from 5 to 100 µm, and the thickness is from 0.5 to 30 µm. It is more preferable for a metal particle 5 that the particle diameter is from 20 to 80 µm, and the thickness is from 1 to 15 µm.

The aspect ratio of a metal particle 5 (thickness/particle diameter) is preferably from 0.5/100 to 30/100, and more preferably from 1/80 to 15/80.

For confirming whether the shape and size of metal particles 5 forming a metallic coating layer 3 satisfy the constitution of the present disclosure, a cross-section of the metallic coating layer 3 should be observed (observation of a cross-section cut in the thickness direction of a coating layer). For preparing a sample for cross-section observation, a publicly known resin embedding method, or cross-section polishing method may be applied.

Specifically, measurements of the particle diameter, and the thickness of a metal particle 5 are conducted as follows. Cross-section observation of a metallic coating layer 3 (observation of a region equivalent to a length of 2.5 mm parallel to a metallic coating layer 3 in a cross-section cut in the thickness direction of a metallic coating layer 3) is conducted with a light microscope, or a SEM (scanning electron microscope. The mean values of particle diameters, and thicknesses of respective metal particles observed in at least 3 visual fields (magnification 500×) in the region are calculated. The mean values are defined as the particle diameter and the thickness of a metal particle 5. The aspect ratio of a metal particle is a value calculated from the mean values of the particle diameter and the thickness of a metal particle.

The thicknesses of an oxide film covering a surface of a metal particle is measured as follows. Cross-section observation of a metallic coating layer 3 (observation of a region equivalent to a length of 2.5 mm parallel to a metallic coating layer 3 in a cross-section cut in the thickness direction of a metallic coating layer 3) is conducted with a SEM (scanning electron microscope). From metal particles 5 observed in at least 3 visual fields (magnification 10,000×) in the region, 3 metal particles 5 are selected in each visual field. Then, the thickness of an oxide film covering a surface of each of 3 selected metal particles 5 (at least total 9 particles) is measured at optional 3 positions per each particle, and the mean value thereof is calculated. The mean value is defined as the thickness of an oxide film.

When the particle diameter of a metal particle 5 exceeds 100 µm, cracking is apt to occur inside a particle, which causes decrease in corrosion resistance, or exfoliation of a film. A particle having a particle diameter less than 5 µm arrives at a steel sheet at an extremely low speed, and deformation may be mild so that adhesion may become lower. Further, when the initial particle diameter of a metal particle is small, the feedability may be low, so that the productivity may be lower, which is undesirable.

When the thickness of a metal particle 5 exceeds 30 μm, cracking is apt to occur inside a particle, which causes decrease in corrosion resistance, or exfoliation of a film. Further, due to mild deformation, the adhesion may become lower. A particle with a thickness less than 0.1 μm arrives at a steel sheet at an extremely low speed, and deformation may be mild, so that adhesion may be lower.

Next, a method of measuring the area fractions of a quasicrystalline phase, an $MgZn_2$ phase, and the balance structure of a metallic coating layer 3 will be described.

SEM-backscattered electron images of at least 3 visual fields (at least 3 visual fields of a region equivalent to a length of 500 μm parallel to a metallic coating layer 3 at a magnification of 5,000×) of an optional cross-section of a metallic coating layer 3 (a cross-section cut in the thickness direction of a coating layer) are photographed. Referring to separately obtained experimental results of TEM observation, a quasicrystalline phase, an $MgZn_2$ phase, and the balance structure in a SEM-backscattered electron image are specified. Compassing a component mapping image in a predetermined visual field, spots having the same component composition as a quasicrystalline phase, an $MgZn_2$ phase, and the balance structure in a metallic coating layer 3 are specified, followed by an image processing to specify a quasicrystalline phase, an $MgZn_2$ phase, and the balance structure in a metallic coating layer 3. Images having selected the respective ranges of a quasicrystalline phase, an $MgZn_2$ phase, and the balance structure are prepared by an image analyzer, and the percentages of a quasicrystalline phase, an $MgZn_2$ phase, and the balance structure in a metallic coating layer 3 are measured. The mean value of 3 visual fields treated as above is used as an area fraction for each quasicrystalline phase, $MgZn_2$ phase, and balance structure in a metallic coating layer 3.

For identification of each phase in a metallic coating layer 3, a cross-section of a metallic coating layer 3 (a cross-section cut in the thickness direction of a coating layer) is processed by a FIB (focused ion beam), and then an electron diffraction image by TEM (transmission electron microscopy) is analyzed.

The composition of a metallic coating layer 3 preferably includes, in terms of % by mass, Zn from 11 to 80%, Al from 3 to 80%, Mg from 8 to 45%, and Ca from 1 to 5%, while Zn+Al>Mg is satisfied. Specifically, the composition of a metallic coating layer 3 excluding oxygen more preferably includes, in terms of % by mass, Zn from 11 to 80%, Al from 3 to 80%, Mg from 8 to 45%, Ca from 1 to 5%, and impurities as the balance, while the Zn content, Al content, and Mg content satisfy Zn+Al>Mg (total of Zn content and Al content>Mg content).

In this regard, an impurity means a component contained in a source material, or a component come to be mixed in a production process, which is not added intentionally.

Firstly, with respect to the composition of a metallic coating layer 3, a numerical limited range and the reason for limitation will be described "Zn (zinc): from 11 to 80%"

For obtaining a quasicrystalline phase as a metallic structure of a metallic coating layer 3 (namely, a metal particle 5 constituting a metallic coating layer 3), Zn should be contained in the above range. Namely, the Zn content in a metallic coating layer 3 is from 11 to 80%. When the Zn content is less than 11%, it is not possible to form a quasicrystalline phase in a metallic coating layer 3. Similarly, when the Zn content exceeds 80%, it is not possible to form a quasicrystalline phase in a metallic coating layer 3.

For improving the corrosion resistance by forming a quasicrystal favorably the Zn content in a metallic coating layer 3 is preferably 33% or more. When it is 33% or more, a quasicrystalline phase is apt to grow as a primary crystal in the composition range, so that growth of an Mg phase as a primary crystal becomes difficult. In other words, the amount (area fraction) of a quasicrystalline phase in a metallic coating layer 3 may be at a high level, while an Mg phase, which deteriorate the corrosion resistance, may be minimized. The Zn content in a metallic coating layer 3 is more preferably 35% or more. When a metallic coating layer 3 is formed in the composition range and by a thermal spray method, an Mg phase is nearly absent.

"Al (aluminum): from 3 to 80%"

Al is an element to improve the corrosion resistance of a planar part of a coated steel. Further, Al is an element to promote formation of a quasicrystalline phase. For developing such effects, the Al content in a metallic coating layer 3 should be 3% or more. On the other hand, when a large amount of Al is contained in a metallic coating layer 3, it become easier for red rust to appear, and becomes more difficult to form a quasicrystalline phase, so that the corrosion resistance is impaired. Therefore, the upper limit of the Al content of a metallic coating layer 3 should be 80%. Further, for facilitating formation of a quasicrystalline phase, the Al content is preferably from 3% to less than 13%, and more preferably from 5% to 50%. Al is a preferable element to be included for forming an Fe—Al interfacial alloy layer 2A According to the result of a research by the inventors concerning the relationship between the thickness and the component of an Fe—Al alloy layer 2A, in a case in which the Al content in a metallic coating layer 3 is 13% or more, the thickness of an Fe—Al alloy layer 2A tends to increase. When an Fe—Al alloy layer 2A is too thick, it would lead to decrease in the Al content in a metallic coating layer 3, so that formation of a quasicrystalline phase becomes difficult, and further the corrosion resistance or performances of a metallic coating layer 3 are deteriorated, and therefore such situation should better avoided. Consequently, also for making an Fe—Al alloy layer 2A thinner, the Al content is preferably from 3% to less than 13%, and more preferably from 5% to 50%.

Intrinsically, Mg is not reactive with Fe, lowers the activity of Zn and Al, and has moderate reactivity with a steel matrix. Therefore, it is suitable suitable an alloy for a metallic coating layer 3. Meanwhile, when the Al concentration is high, it is preferable to select an appropriate heat treatment condition, such as a reduction of a thermal spray time, or acceleration of a thermal spray speed, so as to prevent excessive progress of a reaction between a metallic coating layer 3 and a steel matrix.

"Mg (magnesium): from 8 to 45%"

Mg, similar to Zn and Al, is a principal element to constitute a metallic coating layer 3, and is further an element to improve the sacrificial corrosion protection property. Further, Mg is an important element to promote formation of a quasicrystalline phase.

In other words, the Mg content may be from 8% to 45%, and is preferably from 15% to 35%. Meanwhile, it is preferable from the viewpoint of improvement of corrosion resistance to prevent Mg contained in a metallic coating layer 3 from precipitating as an Mg phase. In other words, it is preferable to convert Mg contained to a constituent of a quasicrystalline phase, or another intermetallic compound, because an Mg phase deteriorates corrosion resistance.

"Ca: from 1 to 5%"

Ca is an element to improve operability of a thermal spray method. In a thermal spray method, a highly oxidative molten Mg alloy after thermal spray is kept in the air. Therefore, it is preferable to take some measures to prevent oxidation of Mg. Since Ca is oxidized easier than Mg, it forms in a molten state a stable oxide film on a metal particle 5 to prevent oxidation of Mg in the metal particle 5. Therefore, the Ca content in a metallic coating layer 3 should be from 1 to 5%.

When the Ca content is 1% by mass or more, a metallic coating layer 3 with a high Mg content may be favorably kept in the air without being oxidized. On the other hand, since Ca is easily oxidized and may have a negative influence on corrosion resistance, the upper limit thereof is preferably 5%.

A metallic coating layer 3 may contain one or more of Y at from 0% to 3.5%, La at from 0% to 3.5%, and Ce at from 0% to 3.5%. However, Formula (A): Ca+Y+La+Ce<3.5% (therein an element symbol stands for the content (% by mass) of the element) should be preferably satisfied.

When Y, La, and Ce are contained at a certain concentration in a thermally sprayed particle, a quasicrystalline phase is formed more easily. On the other hand, when the Ca concentration is high, or the total concentration of Ca, Y, La, and Ce becomes high, a quasicrystalline phase suddenly stops forming, therefore it is preferable to set the respective upper limits of concentration.

A metallic coating layer 3 may contain one or more of Si at from 0% to 3.5%, Ti at from 0% to 0.5%, Cr at from 0% to 0.5%, Co at from 0% to 0.5%, Ni at from 0% to 0.5%, V at from 0% to 0.5%, Nb at from 0% to 0.5%, Cu at from 0% to 0.5%, Sn at from 0% to 0.5%, Mn at from 0% to 0.2%, Sr at from 0% to 0.5%, Sb at from 0% to 0.5%, Pb at from 0% to 0.5%, C at from 0% to 0.5%, Fe at from 0% to 0.5%, and Cd at from 0% to 0.5%. However, Formula (B): Ti+Cr+Co+Ni+V+Nb+Cu+Sn+Mn+Sr+Sb+Pb+C+Fe+Cd≤0.5% (therein an element symbol stands for the content (% by mass) of the element) should be preferably satisfied.

The elements may be contained in a metallic coating layer 3, and Formula (B) is a composition range, in which the respective elements may be included without impeding formation of a quasicrystalline phase, or deteriorating the performances of a metallic coating layer 3. Departing from the range of Formula (B), it becomes difficult to form a quasicrystalline phase.

Since Zn, Al, and Mg are elements composing a quasicrystal, it is prerequisite to be contained in a metallic coating layer 3 in the above defined ranges, and outside the composition ranges, it may become impossible to include a quasicrystalline phase in a metallic coating layer 3 (Zn—Mg—Al alloy layer) at 20% or more.

Further, the composition of a metallic coating layer 3 more preferably satisfies that Zn is from 11 to 72%, Al is from 5 to 67%, Mg is from 10 to 35%, Ca is from 1 to 5%, and Zn+Al>Mg, from the viewpoint of formation of a quasicrystalline phase, still more preferably satisfies that Zn is from 35 to 70%, Al is from 3 to 42%, Mg is from 15 to 25%, Ca is from 1.4 to 3%, and Zn+Al>Mg, and particularly preferably satisfies that Zn is from 35 to 70%, Al is from 5 to 13%, Mg is from 15 to 25%, Ca is from 1.4 to 3%, and Zn+Al>Mg.

Basically with a composition outside the above range of the composition of a metallic coating layer 3, it is difficult to obtain a quasicrystal. Further, it may be a composition range, in which a metallic coating layer 3 becomes hard, such that exfoliation of a metallic coating layer 3 may occur easily, and is therefore not suitable as a metallic coating layer 3.

The measuring methods for the composition of a metallic coating layer 3, and the thickness of a metallic coating layer 3 or an Fe—Al alloy layer 2A are as follows.

An Fe—Al alloy layer 2A is passivated by fuming nitric acid and only a metallic coating layer 3 as an upper layer is peeled, and a solution thereof is analyzed by inductively coupled plasma atomic emission spectrometry (ICP-AES), or inductively coupled plasma mass spectrometry (ICP-MS) to measure the composition of the metallic coating layer 3.

In this regard, a quasicrystalline phase in a metallic coating layer 3 is defined as a quasicrystalline phase in which the Mg content, the Zn content, and the Al content in terms of atom-% satisfy $0.5 \leq Mg/(Zn+Al) \leq 0.83$. In other words, it may be defined as a quasicrystalline phase in which the ratio of Mg atom to a total of Zn atom and Al atom, namely Mg/(Zn+Al) is from 3/6 to 5/6. It is believed that the theoretical ratio of Mg/(Zn+Al) is 4/6.

Chemical components of a quasicrystalline phase are preferably calculated based on a quantitative analysis by transmission electron microscope-energy dispersive X-ray spectroscopy (TEM-EDX), or a quantitative analysis by electron probe micro-analyzer (EPMA) mapping. It is not easy to define a quasicrystal by an accurate chemical formula as in the case of an intermetallic compound. This is because a repetitive lattice unit such as a unit lattice of a catalyst cannot be defined for a quasicrystalline phase, and further the atom position of Zn, or Mg may be hardly specified.

Although a metallic coating layer 3 contains an $MgZn_2$ phase and the balance structure besides a quasicrystalline phase, the balance structure is a structure other than a quasicrystalline phase and an $MgZn_2$ phase, and includes an $Mg_{51}Zn_{20}$ phase, an $Mg_{32}(Zn, Al)_{49}$ phase, an MgZn phase, an $Mg_2Zn_3$ phase, a Zn phase, an Al phase, etc.

A quasicrystalline phase is a crystal structure discovered first in 1982 by Dr. Daniel Shechtman, and has an icosahedral atomic arrangement. This crystal structure is an aperiodic crystal structure having unique rotational symmetry, such as 5-fold symmetry, not obtainable with an ordinary metal, or alloy, and is known as a crystal structure equivalent to an aperiodic structure represented by 3-dimensional Penrose pattern. For identification of this metal substance, it is to be validated that a radial regular-decagonal electron beam diffraction image derived from an icosahedral structure is obtained from the phase, ordinarily by electron beam observation based on TEM observation. For example, the electron beam diffraction image shown in FIG. 2 below is obtainable only from a quasicrystal but not from any other crystal structures.

Meanwhile, a quasicrystalline phase obtained from a chemical composition of a metal alloy layer 3 shows a diffraction peak by X-ray diffraction identifiable for simplification sake as an $Mg_{32}(Zn, Al)_{49}$ phase with JCPDS cards: PDF#00-019-0029, or #00-039-0951.

A quasicrystalline phase is a substance having excellent in corrosion resistance, and when it is present in a metal alloy layer 3 (Zn—Mg—Al layer) the corrosion resistance is improved. Especially, when it is contained in a metal alloy layer 3 at a content in terms of area fraction of 5% or more, white rust tends to be inhibited in an early stage of corrosion. When it is contained at a content in terms of area fraction of 20% or more, the effect becomes stronger. In other words, a quasicrystalline phase formed on a surface of a metal alloy layer 3 (Zn—Mg—Al alloy layer) exhibits a high barrier effect with respect to corrosion factors.

When a quasicrystalline phase is corroded by an accelerated corrosion test or otherwise, a corrosion product with a high barrier effect is formed to protect a steel matrix from corrosion for a long term. The content ratio of a Zn—Mg—Al contained in a quasicrystalline phase is related with a corrosion product with a high barrier effect. With respect to the component composition in a metal alloy layer 3 (a Zn—Mg—Al alloy layer), when the equation Zn>Mg+Al+Ca (therein an element symbol stands for the content (% by mass) of the element) holds, the barrier effect of the corrosion product is high. With respect to corrosion resistance, a higher area fraction of a quasicrystalline phase is generally preferable. When the area fraction of a quasicrystalline phase is 80% or more, the effect is especially great. The effect develops significantly in a combined cyclic corrosion test including a cyclic salt spray test (SST).

Although an $MgZn_2$ phase and an $Mg_2Zn_3$ phase have a corrosion resistance improvement effect owing to their presence weaker than a quasicrystalline phase, they still have some corrosion resistance, and are superior in alkali corrosion resistance owing to their high Mg content. Even when an intermetallic compound constituted solely with them is present in a metallic coating layer 3, alkali corrosion resistance may be obtained, moreover, if a quasicrystalline phase coexists, an oxide film on a top layer of a metallic coating layer 3 is stabilized in a high alkali environment (pH from 13 to 14) of a quasicrystalline phase to exhibit especially high corrosion resistance. To this end, it is necessary to contain a quasicrystalline phase in a metallic coating layer 3 at an area fraction of 20% or more, and preferable to contain 30% or more.

In a case in which, for example, a metallic coating layer 3 contains a quasicrystalline phase, as well as an $MgZn_2$ phase, and an $Mg_2Zn_3$ phase as the balance phases, and the total of the area fractions of a quasicrystalline phase, an $MgZn_2$ phase, and an $Mg_2Zn_3$ is 75% or more, the corrosion resistance in an alkaline region is improved. For example, such excellent alkali corrosion resistance, that the corrosion amount in a strong alkaline environment, in ammonia water, or in caustic soda is nearly 0, may be obtained.

Within a composition range from which a quasicrystalline phase is obtainable, an Al phase may occasionally coexist in a metallic coating layer 3 besides a quasicrystal as a balance structure. An Al phase is a very soft coating, and has plastic deformation capability, and by inclusion of such a phase, a metallic coating layer 3 may acquire plastic deformation capability.

When a metallic coating layer 3 includes an Al phase at an area fraction of 50% or more, and the total area fraction together with a quasicrystalline phase exceeds 75%, the metallic coating layer 3 acquires ductility, and becomes superior in, for example, impact resistance, such that the exfoliation amount of a metallic coating layer 3 is remarkably decreased at a ball impact test.

"Method of Forming Metallic Coating Layer 3"

For forming a metallic coating layer 3 a powder or a wire rod of a thermal spray material, in which the respective elements are blended to the above composition, is prepared. For example, for obtaining a powder the respective metals are accommodated at an intended composition in a heat-resistant container such as a crucible, melted, and solidified. When the respective metals are melted, it is preferable to use small metal clumps for the sake of uniform mixing. With respect to an atmosphere during heating and melting, an inert gas atmosphere is desirable in order to avoid contamination with impurities, and, for example, use of an atmosphere with an oxygen concentration of 1% or less is desirable.

For solidification, a solidification means utilizing an atomizing method, etc. may be used, or the mixture may be solidified in a crucible and the solidified product may be pulverized by grinding.

There is no particular restriction on the particle size of a powder used for thermal spraying, and an appropriate range may be selected as needed considering a required area, and thickness of a metallic coating layer 3, or the like. For example, the particle diameter of approx. from 50 μm to 200 μm may be selected.

As a thermal spray method, plasma spraying, arc spraying, etc. may be adopted.

Since an alloy with the desirable composition is very brittle, it may be easily pulverized by a grinding method, however in a case in which the shape and dimension of particles are not uniform, the coating efficiency is decreased, and therefore it is desirable to use an atomizing method of pulverization, and among others it is desirable to adopt a gas atomizing method, by which surface oxidation can be mild. It is desirable to use particles with a uniform particle size within a predetermined range by performing further classification of the pulverized particles.

An Mg-containing Zn alloy coated steel 1, in which a surface of a steel 2 is coated with a metallic coating layer 3 as a layered structure of plural layers of metal particles 5 as shown in FIG. 1, may be obtained by feeding a powder prepared as above to a thermal spray gun, and thermally spraying it to a surface of a steel 2 to form a thermal spray layer. Since a thermal spray gun melts a thermal spray material and spurts it out as fine droplets, a metallic coating layer 3, in which plural metal particles 5 are layered, may be obtained by building up solidified products of the droplets on a surface of a steel 2.

For regulating the area fraction of a quasicrystalline phase in a metallic coating layer 3 (metal particles 5 constituting a metallic coating layer 3), namely the area fractions of the respective phases in the structure of the the metallic coating layer 3, temperature regulation is effective. Since a phase that is most stable in a temperature range of from 500 to 350° C. is a quasicrystalline phase, it is possible to enhance the the area fraction of a quasicrystalline phase in a metallic coating layer 3 (Zn—Al—Mg alloy layer) by prolonging the retention time in the temperature range. It is more preferable the the retention time is 30 sec or more, and the cooling rate is below 5° C./sec. When the cooling rate is below 5° C./sec, precipitation of a quasicrystalline phase may be maximized. For example, when the the cooling rate is 5° C./sec or higher, the percentage of a quasicrystalline phase tends to become extremely lower than an intrinsically obtainable level. When it is too high, due to cooling before precipitation of a quasicrystalline phase starts, the content of a quasicrystalline phase becomes low.

On the other hand, in a temperature range of less than 350° C. and not more than 250° C., it is already a stable region of an intermetallic compound phase, such as an $Mg_2Zn_3$ phase, an Mg phase, and an MgZn phase, rather than a quasicrystalline phase, and therefore the cooling rate in the temperature range is required to be increased. At a preferable cooling rate of 10° C./sec or more, it is possible to maintain the maximum value of the area fraction of a quasicrystalline phase in a metallic coating layer 3 (Zn—Al—Mg alloy layer).

In other words, a metallic coating layer 3 is formed by feeding an alloy powder with an intended component composition to a thermal spray gun, and thermally spraying it to a surface of a steel 2 to form a thermal spray layer. Then in a cooling process, it is preferable that the cooling rate is set at less than 5° C./sec in a temperature range of not more than 500° C. and less than 350° C. and maintained for 30 sec or more, and that the cooling rate is set at 10° C./sec or more in a temperature range of less than 350° C. and not more than 250° C.

There is no particular restriction on the cooling rate in a temperature range of less than 250° C. Because in the temperature range, atom diffusion is inactive due to low temperature, which is already lower than a temperature necessary for formation or degradation of a phase.

Since in the case of thermal spray, among various conceivable methods for obtaining a quasicrystalline phase, a relatively high percentage of a starting powder structure is retained, a preheating treatment of a powder prior to thermal spraying is effective. Specifically, for example, a preheating treatment of a powder prior to thermal spraying at from 100 to 200° C. is preferable. By realizing an intended phase structure in advance, a structure of a thermally sprayed particle, which retains a starting powder structure, may be regulated.

From a semi-molten state particle surface, or a particle in a completely molten state, an intended area fraction of a quasicrystalline phase may be obtained by selecting thermal spray conditions (layering pass interval, distance between a thermal spray gun and a steel, and preheating temperature of a steel) so as to control appropriately heat of a particle layered afterward, a thermal spray arc, or the like, and heat extraction to a steel.

Then, by performing a heat treatment to form an Al—Fe alloy layer, the adhesion between a steel 2 and a metallic coating layer 3 is improved. However, when an Fe—Al alloy layer 2A is too thick, decrease in the Al content in a metallic coating layer 3 is caused, such that formation of a quasicrystalline phase becomes difficult, and further the corrosion resistance and the performance of a metallic coating layer 3 are deteriorated. Therefore, for preparing a metallic coating layer 3 with an intended composition and structure, it is preferable to make the thickness of an Al—Fe alloy layer 2A to a range of from 1 to 1000 nm by regulating the composition of a metallic coating layer 3, and the temperature and time of a heat treatment. When the thickness is beyond 1000 nm, decrease in the Al content in a metallic coating layer 3 is caused and formation of a quasicrystalline phase becomes difficult. Meanwhile, when the thickness of an Al—Fe alloy layer 2A is 1 nm or less, the adhesion between a metallic coating layer 3 and a steel 2 may become insufficient. The thickness of an Al—Fe alloy layer 2A is desirably from 100 to 500 nm.

In this regard, the thickness of an Al—Fe alloy layer 2A is measured as follows. Cross-section observation of an Al—Fe alloy layer 2A (observation of a region equivalent to a length of 2.5 mm parallel to an Al—Fe alloy layer 2A in a cross-section cut in the thickness direction of an Al—Fe alloy layer 2A) is conducted with a SEM (scanning electron microscope). The mean value of thicknesses at optional five positions for each Al—Fe alloy layer 2A observed in at least 3 visual fields (magnification 10,000×) in the region (each at least 15 positions) is calculated. The mean value is defined as the thickness of an Al—Fe alloy layer 2A.

The thickness of a metallic coating layer 3 is also a mean value of measurements obtained similarly to the thickness of an Al—Fe alloy layer 2A.

Preparation of a sample for cross-section observation may be performed by a publicly known resin embedding method, or cross section polishing method.

In a metallic coating layer 3 obtained based of the above production method and cooling process, a metallic coating layer 3 constituted with a layered structure of metal particles 5 of a Zn—Al—Mg alloy containing a predetermined percentage of quasicrystalline phases covers a surface of a steel 2. Therefore, a metallic coating layer 3 is hard, superior in abrasion resistance, superior in corrosion resistance, and also superior in corrosion resistance in an alkaline region. Consequently, an Mg-containing Zn alloy coated steel 1, which surface is hard, and which is superior in abrasion resistance, superior in corrosion resistance, and also superior in corrosion resistance in an alkaline region, may be provided.

In the above embodiment, a structure, in which a steel 2 with a smooth surface is coated with a metallic coating layer 3, has been described, however, a structure according to the present disclosure may be applicable to a steel with any shape, such as a steel with a rugged surface, a steel with a profiled section, and a bent steel, insofar as thermal spraying is possible, regardless of the shape of a steel, or existence or nonexistence of ruggedness. Therefore, the technology of this disclosure may be provided regardless of the shape of a steel.

In producing an Mg-containing Zn alloy coated steel according to the present disclosure, a posttreatment may be performed after formation of a metallic coating layer.

Examples of a posttreatment may include various treatments for treating a surface of a coated steel sheet, and include specifically a treatment for providing an upper coating, a chromate treatment, a non-chromate treatment, a phosphate treatment, a lubricity improvement treatment, and a weldability improvement treatment. Further, a posttreatment after formation of a metallic coating layer may include a treatment by which a resin-based paint (such as a polyester resin-based, an acrylic resin-based, a fluorocarbon resin-based, a vinyl chloride resin-based, a urethane resin-based, and an epoxy resin-based paint) is painted by a method, such as a roll painting, a spray painting, a curtain flow painting, a dip painting, and a film lamination method (for example, a film lamination method of laminating a resin film such as an acrylic resin film), to form a paint film.

EXAMPLES

Next the present disclosure will be described based on an Example.

Test pieces of JIS G 3101 (2010), provision SS400 (the 1st steel: length 150 mm, width 70 mm, and thickness 3.2 mm), and JIS G 3101 (2010), provision SS400 (the 2nd steel: length 180 mm, width 70 mm, and thickness 1.6 mm) were used for the following thermal spray tests. However, with respect to the 2nd steel, it was processed to a bent test piece by making a 90° bend with R 2.0 mm at a position 30 mm from an end, for undergoing the following thermal spray test. A test piece of the 1st steel without a bend is hereinafter referred to as a "planar test piece".

A powder with a compositional ratio of Zn/(from 15 to 45% by mass of) Mg/(from 3 to 15% by mass of) Al/(from 2 to 5% by mass of) Ca, (in which % by mass of Zn is the balance), and with a particle size of from 50 to 200 μm was used as a powder for thermal spraying. The particle shape of a powder for thermal spraying was nearly spherical.

As a comparative powder for thermal spraying, an Al powder (average particle diameter 100 μm), a Zn powder (average particle size 250 μm), and an Mg powder (average particle size 280 μm), which were commercially-supplied, were prepared respectively, and used singly or as a mixture according to a test type.

Into plasma generated by an atmospheric pressure plasma arc spraying method using an Ar/$H_2$ gas as a working gas, an intended powder for thermal spraying was supplied with an argon gas. The distance between a thermal spray gun and a steel (substrate) was set at 100 mm and the thermal spray gun was moved such that the temperature of a substrate did not exceeded 500° C. and thermal spray was repeated to regulate the thickness of a formed metallic coating layer (thickness according to an evaluation test described below). Then a powder for thermal spraying at a preheating temperature set forth in Table 1 was thermally sprayed, and then a powder for thermal spraying was thermally sprayed from a thermal spray gun to form a metallic coating layer on a surface of a planar test piece (the 1st steel).

As for cooling conditions, cooling was conducted with a cooling rate in a range of from 3° C. to less than 5° C. from solidification to 350° C., and with a cooling rate in a range of from 10° C. to less than 15° C. from 350° C. to 250° C.

With respect to part of test pieces (cases with symbol Z), the distance between a thermal spray gun and a substrate was set at 150 mm.

Using a similar thermal spray gun, a comparative metallic coating layer from an Al powder, a Zn powder, or a powder mixture thereof was formed on a surface of each planar test piece (the 1st steel).

Meanwhile, a metallic coating layer was formed by thermal spraying using a multiple spindle thermal spray robot on a surface of a bent test piece subjected to a bending work (the 2nd steel) at both the inside and the outside of a bent part.

The composition of a produced metallic coating layer is shown in the following Table 1. The area fraction of each phase was measured by the aforedescribed method.

"Production of Hot Dip Metal Coating Material"

For comparative purpose, steels with metallic coating layers by hot dip metal coating using plural compositions (hereinafter also referred to as "planar hot dip metal coating material") were produced. As a substrate for hot dip metal coating, a steel sheet of JIS G 3101 (2010) provision SS400 with a length of 180 mm, a width of 70 mm, and a thickness of 1.6 mm was used. The compositions of a metal coating by hot dip metal coating are shown in Table 1. The thickness of a metallic coating layer by hot dip metal coating was the same as a metallic coating layer by thermal spraying.

TABLE 1

| | Coating method | | Composition (% by mass) | | | | Structure (area fraction %) | | |
|---|---|---|---|---|---|---|---|---|---|
| Symbol | Type | Powder preheating temperature before thermal spraying | Mg | Zn | Al | Ca | Quasicrystalline phase | $MgZn_2$ phase | Balance structure |
| A | Thermal spray | 120° C. | 15 | 80 | 3 | 2 | 20 | 30 | 50 |
| B | Thermal spray | 120° C. | 20 | 72 | 6 | 2 | 25 | 25 | 50 |
| C | Thermal spray | 120° C. | 25 | 67 | 6 | 2 | 45 | 35 | 20 |
| D | Thermal spray | 120° C. | 25 | 62 | 10 | 3 | 40 | 20 | 40 |
| E | Thermal spray | 120° C. | 15 | 66 | 16 | 3 | 35 | 10 | 55 |
| F | Thermal spray | 120° C. | 35 | 56 | 6 | 3 | 25 | 25 | 50 |
| G | Thermal spray | 120° C. | 35 | 50 | 10 | 5 | 25 | 30 | 45 |
| H | Thermal spray | 120° C. | 35 | 52 | 8 | 5 | 30 | 35 | 35 |
| P | Thermal spray | 120° C. | 10 | 78 | 10.5 | 1.5 | 28 | 35 | 37 |
| Q | Thermal spray | 120° C. | 8 | 80 | 10 | 2 | 28 | 40 | 32 |
| R | Thermal spray | 120° C. | 15 | 78 | 5 | 2 | 22 | 35 | 43 |
| S | Thermal spray | 80° C. | 15 | 78 | 5 | 2 | 22 | 35 | 43 |
| T | Thermal spray | 120° C. | 20 | 66 | 12 | 2 | 24 | 28 | 48 |
| U | Thermal spray | 120° C. | 25 | 53 | 20 | 2 | 20 | 25 | 55 |
| Z | Thermal spray | 120° C. | 25 | 53 | 20 | 2 | 20 | 25 | 55 |
| ZZ | Thermal spray | 120° C. | 25 | 67 | 3 | 2 | 55 | 45 | 0 |
| I | Thermal spray | 120° C. | 15 | 85 | — | — | — | — | — |
| J | Thermal spray | 120° C. | — | 80 | 20 | — | — | — | — |
| K | Thermal spray | 120° C. | — | 45 | 55 | — | — | — | — |
| V | Thermal spray | 120° C. | 6 | 20 | 73 | 1 | — | — | — |
| W | Thermal spray | 120° C. | 50 | 38 | 10 | 2 | — | — | — |
| X | Thermal spray | 120° C. | 30 | 52 | 15 | 3 | — | — | — |
| Y | Thermal spray | 200° C. | 30 | 52 | 15 | 3 | 15 | 20 | 65 |
| L | Hot dip metal coating | — | 20 | 72 | 6 | 2 | 25 | 25 | 50 |
| M | Hot dip metal coating | — | 25 | 67 | 6 | 2 | 45 | 35 | 20 |
| N | Hot dip metal coating | — | 25 | 62 | 10 | 3 | 40 | 20 | 40 |
| O | Hot dip metal coating | — | 30 | 52 | 15 | 3 | 35 | 30 | 35 |

| | Metal particle | | | |
|---|---|---|---|---|
| Symbol | Particle diameter (μm) | Thickness (μm) | Oxide film (nm) | Remarks |
| A | 80 | 3 | 30 | EX |
| B | 75 | 3 | 50 | EX |
| C | 73 | 5 | 80 | EX |
| D | 70 | 5 | 80 | EX |
| E | 60 | 8 | 130 | EX |
| F | 70 | 5 | 160 | EX |
| G | 70 | 5 | 160 | EX |
| H | 75 | 4 | 100 | EX |

TABLE 1-continued

| | | | | |
|---|---|---|---|---|
| P | 70 | 5 | 20 | EX |
| Q | 70 | 5 | 15 | EX |
| R | 70 | 5 | 30 | EX |
| S | 70 | 5 | 15 | EX |
| T | 70 | 5 | 50 | EX |
| U | 70 | 5 | 80 | EX |
| Z | 50 | 10 | 950 | EX |
| ZZ | 60 | 7 | 80 | EX |
| I | 100 | 5 | 30 | CF |
| J | 150 | 1 | 8 | CF |
| K | 80 | 20 | 15 | CF |
| V | 60 | 35 | 25 | CF |
| W | 75 | 32 | 300 | CF |
| X | 180 | 0.2 | 1050 | CF |
| Y | 100 | 0.5 | 500 | CF |
| L | — | — | — | CF |
| M | — | — | — | CF |
| N | — | — | — | CF |
| O | — | — | — | CF |

"Evaluation of Corrosion Resistance"

Corrosion resistance was evaluated by a corrosion acceleration test. The corrosion acceleration test was performed by a salt water spray test (SST) using a 5% NaCl aqueous solution specified by JIS Z2371. The test was continued up to 6000 hr, and time elapses until red rust appeared on each planar test piece, and planar hot dip metal coating material were compared. The end surfaces, and the back sides of every test pieces were sealed with a tape. The total thickness of each metallic coating layer was set at 25 μm.

Similarly, with respect to a bent test piece, both the inside and the outside of a bent part were evaluated respectively. Further, with respect to a bent hot dip metal coating material, prepared by making a 90° bend with R 2.0 mm at a position 30 mm from an end of a planar hot dip metal coating material, both the inside and the outside of a bent part were evaluated respectively.

"Evaluation of Abrasion Resistance and Resistance to Scratch"

For evaluation of the abrasion resistance and resistance to scratch, a linear friction tester produced by Shinto Scientific Co., Ltd. (HEIDON) was used. A steel ball (20R, material SKD11) was used as a contacting member, and a load of 500 g, a sliding distance of 40 mm, and a speed of 1200 mm/min were used. After 10 round trips, a surface of each planar test piece, and planar hot dip metal coating material was visually examined. The thicknesses of all metallic coating layers were 12 μm.

After the test, in a case in which a scratch or chipping was obvious on a surface of any planar test piece, or planar hot dip metal coating material, it was rated as "G4". In a case in which the color at a not-tested area was significantly changed from that at a tested area, it was rated as "G3". In a case in which the color at a not-tested area was slightly changed from that at a tested area, it was rated as "G2". In a case in which the appearance was almost the same as before the test, it was rated as "G1".

The results of evaluation tests on corrosion resistance are shown in the following Table 2 and Table 3, and the results of evaluation tests on abrasion resistance and resistance to scratch are shown in the following Table 4.

TABLE 2

| Symbol | Test piece | Steel | Generation of red rust and time elapse | Remarks |
|---|---|---|---|---|
| 1 | A | Planar | Generated: 5000 hr | EX |
| 2 | A | Outside of bend | Generated: 5000 hr | EX |
| 3 | A | Inside of bend | Generated: 5000 hr | EX |

TABLE 2-continued

| Symbol | Test piece | Steel | Generation of red rust and time elapse | Remarks |
|---|---|---|---|---|
| 4 | B | Planar | Not generated | EX |
| 5 | B | Outside of bend | Not generated | EX |
| 6 | B | Inside of bend | Not generated | EX |
| 7 | C | Planar | Not generated | EX |
| 8 | C | Outside of bend | Not generated | EX |
| 9 | C | Inside of bend | Not generated | EX |
| 10 | D | Planar | Not generated | EX |
| 11 | D | Outside of bend | Not generated | EX |
| 12 | D | Inside of bend | Not generated | EX |
| 13 | E | Planar | Generated: 5000 hr | EX |
| 14 | E | Outside of bend | Generated: 5000 hr | EX |
| 15 | E | Inside of bend | Generated: 5000 hr | EX |
| 16 | F | Planar | Not generated | EX |
| 17 | F | Outside of bend | Not generated | EX |
| 18 | F | Inside of bend | Not generated | EX |
| 19 | G | Planar | Not generated | EX |
| 20 | G | Outside of bend | Not generated | EX |
| 21 | G | Inside of bend | Not generated | EX |
| 22 | H | Planar | Not generated | EX |
| 23 | H | Outside of bend | Not generated | EX |
| 24 | H | Inside of bend | Not generated | EX |
| 25 | I | Planar | Generated: 4000 hr | CF |
| 26 | I | Outside of bend | Generated: 4000 hr | CF |
| 27 | I | Inside of bend | Generated: 4000 hr | CF |
| 28 | J | Planar | Generated: 2000 hr | CF |
| 29 | J | Outside of bend | Generated: 2000 hr | CF |
| 30 | J | Inside of bend | Generated: 2000 hr | CF |
| 31 | K | Planar | Generated: 2000 hr | CF |
| 32 | K | Outside of bend | Generated: 2000 hr | CF |
| 33 | K | Inside of bend | Generated: 2000 hr | CF |
| 34 | L | Planar | Generated: 5000 hr | CF |
| 35 | L | Outside of bend | Generated: 2500 hr | CF |
| 36 | L | Inside of bend | Generated: 1000 hr | CF |
| 37 | M | Planar | Generated: 5000 hr | CF |
| 38 | M | Outside of bend | Generated: 2500 hr | CF |
| 39 | M | Inside of bend | Generated: 1000 hr | CF |
| 40 | N | Planar | Generated: 5000 hr | CF |
| 41 | N | Outside of bend | Generated: 2500 hr | CF |
| 42 | N | Inside of bend | Generated: 1000 hr | CF |

TABLE 3

| Symbol | Test piece | Steel | Generation of red rust and time elapse | Remarks |
|---|---|---|---|---|
| 43 | O | Planar | Generated: 5000 hr | CF |
| 44 | O | Outside of bend | Generated: 2500 hr | CF |
| 45 | O | Inside of bend | Generated: 1000 hr | CF |
| 46 | P | Planar | Not generated | EX |
| 47 | P | Outside of bend | Not generated | EX |

TABLE 3-continued

| Symbol | Test piece | Steel | Generation of red rust and time elapse | Remarks |
|---|---|---|---|---|
| 48 | P | Inside of bend | Not generated | EX |
| 49 | Q | Planar | Not generated | EX |
| 50 | Q | Outside of bend | Not generated | EX |
| 51 | Q | Inside of bend | Not generated | EX |
| 52 | R | Planar | Not generated | EX |
| 53 | R | Outside of bend | Not generated | EX |
| 54 | R | Inside of bend | Not generated | EX |
| 55 | S | Planar | Not generated | EX |
| 56 | S | Outside of bend | Not generated | EX |
| 57 | S | Inside of bend | Not generated | EX |
| 58 | T | Planar | Not generated | EX |
| 59 | T | Outside of bend | Not generated | EX |
| 60 | T | Inside of bend | Not generated | EX |
| 61 | U | Planar | Generated: 5000 hr | EX |
| 62 | U | Outside of bend | Generated: 5000 hr | EX |
| 63 | U | Inside of bend | Generated: 5000 hr | EX |
| 64 | V | Planar | Generated: 5000 hr | CF |
| 65 | V | Outside of bend | Generated: 2500 hr | CF |
| 66 | V | Inside of bend | Generated: 1000 hr | CF |
| 67 | W | Planar | Generated: 5000 hr | CF |
| 68 | W | Outside of bend | Generated: 2500 hr | CF |
| 69 | W | Inside of bend | Generated: 1000 hr | CF |
| 70 | X | Planar | Generated: 2500 hr | CF |
| 71 | X | Outside of bend | Generated: 500 hr | CF |
| 72 | X | Inside of bend | Generated: 500 hr | CF |
| 73 | Y | Planar | Generated: 3000 hr | CF |
| 74 | Y | Outside of bend | Generated: 1000 hr | CF |
| 75 | Y | Inside of bend | Generated: 1000 hr | CF |
| 76 | Z | Planar | Not generated | EX |
| 77 | Z | Outside of bend | Not generated | EX |
| 78 | Z | Inside of bend | Not generated | EX |
| 79 | ZZ | Planar | Not generated | EX |
| 80 | ZZ | Outside of bend | Generated: 5000 hr | EX |
| 81 | ZZ | Inside of bend | Generated: 5000 hr | EX |

TABLE 4

| Symbol | Test piece | Result | Remarks |
|---|---|---|---|
| 1 | A | G2 | EX |
| 2 | B | G1 | EX |
| 3 | C | G1 | EX |
| 4 | D | G1 | EX |
| 5 | E | G3 | EX |
| 6 | F | G1 | EX |
| 7 | G | G1 | EX |
| 8 | H | G1 | EX |
| 9 | I | G4 | CF |
| 10 | J | G4 | CF |
| 11 | K | G4 | CF |
| 12 | L | G4 | CF |
| 13 | M | G4 | CF |
| 14 | N | G4 | CF |
| 15 | O | G4 | CF |
| 16 | P | G1 | EX |
| 17 | Q | G1 | EX |
| 18 | R | G1 | EX |
| 19 | S | G1 | EX |
| 20 | T | G1 | EX |
| 21 | U | G3 | EX |
| 22 | V | G4 | CF |
| 23 | W | G4 | CF |
| 24 | X | G4 | CF |
| 25 | Y | G4 | CF |
| 26 | Z | G3 | EX |
| 27 | ZZ | G3 | EX |

As shown in Table 2, any steel with a metallic coating layer by thermal spray according to the disclosure was free of generation of red rust until 6000 hr in SST to demonstrate high corrosion resistance. Among comparative materials, some coating had high corrosion resistance at a not-processed part, but exfoliation of a coating (powdering) was caused by a processing, such that the corrosion resistance at a processed part was impaired drastically. Further as shown in Table 3, a steel with a metallic coating layer by thermal spray according to the disclosure was superior in abrasion resistance and resistance to scratch.

Figure 2:
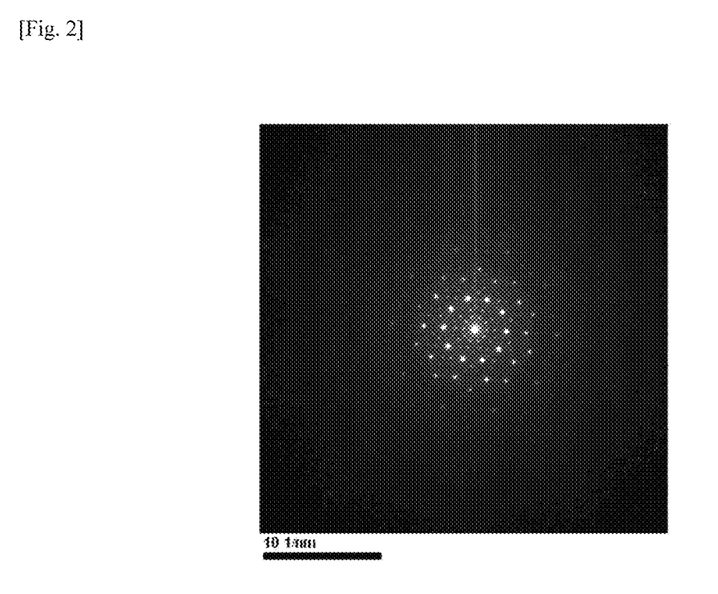
FIG. 2 is a TEM electron beam diffraction image of a quasicrystalline phase in a metallic coating layer obtained in an Example.

FIG. 2 shows an electron beam diffraction image of an area, which was identified as an area of a quasicrystalline phase through cross-sectional TEM observation of the No. 4 sample in Table 1. Since as shown in FIG. 2 a radial regular-decagonal electron beam diffraction image derived from an icosahedral structure was obtained, it has been confirmed that a quasicrystalline phase was precipitated in the sample.

The entire contents of the disclosures by Japanese Patent Application No. 2015-191855 are incorporated herein by reference.

All the literature, patent application, and technical standards cited herein are also herein incorporated to the same extent as provided for specifically and severally with respect to an individual literature, patent application, and technical standard to the effect that the same should be so incorporated by reference.

The invention claimed is:

1. An Mg-containing Zn alloy coated steel, comprising:
a steel; and
a metallic coating layer placed on a surface of the steel, wherein:
the metallic coating layer is a layered structure of plural flat-form metal particles having a particle diameter of from 5 to 100 μm, and a thickness of from 0.5 to 30 μm,
a composition of the metallic coating layer satisfies, in terms of % by mass: Zn being from 11 to 80%, Al being from 3 to 80%, Mg being from 8 to 45%, Ca being from 1 to 5%, and Zn+Al>Mg, and
the structure of the metallic coating layer comprises a quasicrystalline phase, an $MgZn_2$ phase, and optionally a balance structure, wherein a total area fraction of the quasicrystalline phase and the $MgZn_2$ phase is 45% or more, an area fraction of the balance structure is from 0 to 55%, an area fraction of the quasicrystalline phase is 20% or more, and an area fraction of the $MgZn_2$ phase is 3% or more,
wherein an area fraction of the structure of the metallic coating layer is determined from a cross-section cut in a thickness direction of a coating layer.

2. The Mg-containing Zn alloy coated steel according to claim 1, wherein a Al content is from 3% to less than 13% in terms of % by mass.

3. The Mg-containing Zn alloy coated steel according to claim 1, further comprising an oxide film covering a surface of each metal particle, wherein the oxide film has a film thickness of from 1 nm to 1000 nm.

4. The Mg-containing Zn alloy coated steel according to claim 1, wherein the metallic coating layer is a thermal spray coating layer.

5. The Mg-containing Zn alloy coated steel according to claim 1, wherein the composition of the metallic coating layer further comprises one or more of Y, La, Ce, Si, Ti, Cr, Co, Ni, V, Nb, Cu, Sn, Mn, Sr, Sb, Pb, C, Fe, and Cd; and
wherein the following Formula (A), and the following Formula (B) are satisfied:

$$Ca+Y+La+Ce \leq 3.5\% \quad \text{Formula (A)}$$

$$Ti+Cr+Co+Ni+V+Nb+Cu+Sn+Mn+Sr+Sb+Pb+C+Fe+Cd \leq 0.5\%; \text{ and} \quad \text{Formula (B)}$$

wherein, in Formula (A) and Formula (B), an element symbol stands for the content of the element in terms of % by mass; and wherein, if the composition further comprises Si, Si is present at up to 3.5% by mass.

* * * * *